Patented Apr. 21, 1925.

1,534,539

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF EMULSIFYING MILK OIL.

No Drawing.   Application filed May 29, 1924.   Serial No. 716,597.

*To all whom it may concern:*

Be it known that I, CHARLES E. NORTH, a citizen of the United States of America, residing at Montclair, in the county of Essex and State of New Jersey, have invented certain new and useful Improvements in Processes of Emulsifying Milk Oil, of which the following is a full, clear, and exact description.

In processes of emulsifying milk oil, heretofore described by me in patents and applications, I have prescribed the use of dried milk or skim milk in the form of a powder, as the emulsifying agent for the fat from which paste emulsions may be formed by simple stirring.

For example, if melted milk fat at a temperature above 96° F. be mixed with the proper amount of dried skim milk powder and then stirred, such mixing may be followed by the addition of suitable quantities of water and milk oil until an emulsion in the form of a thick paste results in which by the simple friction of the substance of the mass within itself, fat globules are formed of approximately the same size as those in natural milk and cream. Such paste emulsion may be diluted with more water to produce a cream, containing, for example, 40% fat which is known to the trade as "extra heavy" cream.

Up to the present time all attempts to produce emulsion by the use of melted milk fat and fluid milk or skim milk by simple mixing and stirring have failed, this being due to the extremely fluid condition of the melted oil and that of the milk or skim milk. This condition renders the mixture too thin or with too little viscosity to create the internal friction in the mass itself, which is the chief factor in transforming oil into fat globules by the mixing method of emulsification. This is not the case when dried or powdered milks are employed as these, owing to the absence of moisture, will when added to the oil, form masses of sufficient thickness or viscosity to create such emulsions.

There are objections, however, to the use of dried milks for this purpose, for, owing to irregularities in manufacture they are apt to impart to the product flavors different from and foreign to that of natural fluid milk, and for this reason it would be most desirable to have some process by which fluid milk can be used, so that their flavors may be retained in the emulsified products of milk fat. This, it may be readily observed, is particularly true of cream for table use, in the manufacture of ice-cream, butter and other like products.

It will be noted that when a paste emulsion has once been formed by the use of dried or powdered milk and oil that both fluid oil and water may then be added and that continued agitation or mixing will emulsify the oil and incorporate the water into the pasty mass, until the paste emulsion is increased in bulk by the exact amount of the oil and water added, or, in other words, the original will make a new paste out of the liquids added.

I have found that if fluid milk or skim milk instead of water be added to the paste formed in this way, that the same results are obtained. For example, if, to produce a cream containing 40% fat, 5 parts of dried powdered skim milk be added to 20 parts of melted milk oil at a temperature of 100° F. or over, these two ingredients readily mix. If then, 5 parts of warm water be added a continued mixing quickly produces a thick paste emulsion, or, if instead of the water, 5 parts of fluid milk or skim milk be substituted and the mixing continued the paste emulsion is formed with equal or even better facility; the remaining 20 parts of the fat may then be added with an additional 5 parts of skim milk and by mixing, these will be quickly incorporated into the paste emulsion.

I have discovered that the use of fluid milk or skim milk in lieu of water in such a mixture enables me to very materially decrease the proportion of milk powder used. For example, if it requires 5 parts of dried milk powder to emulsify 40 parts of milk oil when these two substances are mixed with proper proportions of water and the emulsification is effected by the internal friction of the pasty mass, I have found that I require only one-fourth to one-twelfth this amount of dried milk powder to obtain the same result, provided I use fluid milk or skim milk instead of water as the third ingredient.

To state this in figures: If a cream containing 40% fat is desired, the formula expressed in parts per thousand when water is added to the mixture of milk oil and dried milk powder would be as follows:

|  | Parts. |
|---|---|
| Fat | 400 |
| Dry milk powder | 54 |
| Water | 546 |
|  | 1000 |

On the other hand, if fluid milk or skim milk be used in lieu of water, the formula would be:

|  | Parts. |
|---|---|
| Fat | 400 |
| Dry milk powder | 4.5 |
| Fluid milk | 595.5 |
|  | 1000 |

In the latter case I first mix only 20 parts of oil with 4.5 parts of dry milk powder and form a thickened mixture which rapidly changes into a paste emulsion on agitation with 5 parts of fluid milk or skim milk. The viscous pasty mass thus formed, when stirred, sets up a friction within itself, which will rapidly emulsify the remaining 380 parts of fat and 590 parts of fluid milk, provided the oil and the milk be added gradually, care being taken by the operator to keep the pasty mass at such a degree of viscosity that there is sufficient internal friction to effectively emulsify the fat. When all of the fat has thus been incorporated into the paste emulsion, any excess of fluid milk remaining may be readily mixed with the pasty mass to form the finished product—a cream containing 40% fat.

While the starting point of the paste emulsion is still milk oil and dried milk powder, still, the greater part of the ultimate emulsion is composed of milk oil and fluid milk, from which it follows that the flavor of the cream very much more closely resembles that of the fluid milk, or natural cream, than any other reconstructed cream heretofore made by known processes.

Under commercial conditions the paste emulsion can be started on a small scale by the use of milk oil and dried milk powder and portions of this pasty mass can be transferred to the mixing machines where they serve as nuclei for starting the further emulsification of additional portions of melted milk fat and fluid milk or skim milk. This very greatly facilitates the manufacture of a natural flavored reconstructed cream as only a small quantity of the original paste can be used as the starting point for the manufacture of emulsion of milk oil and fluid milk in large quantities.

It will be observed that either whole milk or skim milk may be used in this process, and that the character of the dried milk or milk powder is not material, provided it contain the milk solids not fat and constitutes an efficient emulsifying agent. It will also be seen that the percentage of milk fluid adopted will be largely determined by the flavor desired in a finished product.

Having now described my invention what I claim is:—

1. The process herein described of emulsifying milk oil and fluid milk to produce a natural flavored reconstructed cream which consists in mixing relatively small quantities of milk oil and dried milk powder, adding to this mixture, as a nucleus, fluid milk and milk oil, stirring the same to produce a paste emulsion and adding to such paste the quantity of fluid milk required to produce the desired finished product.

2. The process herein set forth of producing a natural flavored reconstructed cream by the emulsification of milk oil and fluid milk, which consists in mixing together relatively small amounts of milk oil and dried milk powder, dividing this mixture into batches to form nuclei for the emulsions, adding to each batch the desired quantities of milk oil and fluid milk to produce the finished product and producing the emulsion by stirring.

3. The process of bringing about the emulsification of fluid milk and melted milk oil which consists in adding fluid milk to a mixture of milk oil and a very small amount of dried milk powder as a nucleus and stirring the same while adding further amounts of milk oil and fluid milk until the desired product is obtained.

In testimony whereof I hereto affix my signature.

CHARLES E. NORTH